United States Patent
Bangle

(10) Patent No.: US 10,218,168 B2
(45) Date of Patent: Feb. 26, 2019

(54) LOAD SIDE GROUND FAULT CIRCUIT INTERRUPTION PROTECTION FOR FLUID PUMP MOTOR

(71) Applicant: Thomas Michael Bangle, Sandpoint, ID (US)

(72) Inventor: Thomas Michael Bangle, Sandpoint, ID (US)

(73) Assignee: Thomas M. Bangle, Priest River, ID (US)

( * ) Notice: Subject to any disclaimer, the term of this patent is extended or adjusted under 35 U.S.C. 154(b) by 0 days.

(21) Appl. No.: 15/217,025

(22) Filed: Jul. 22, 2016

(65) Prior Publication Data

US 2017/0373485 A1 Dec. 28, 2017

Related U.S. Application Data

(60) Provisional application No. 62/353,661, filed on Jun. 23, 2016.

(51) Int. Cl.
| | |
|---|---|
| *H02H 3/16* | (2006.01) |
| *H02H 7/08* | (2006.01) |
| *H02H 3/32* | (2006.01) |

(52) U.S. Cl.
CPC .............. *H02H 7/08* (2013.01); *H02H 3/32* (2013.01)

(58) Field of Classification Search
USPC .......... 318/563, 400.21, 400.22, 783; 361/42
See application file for complete search history.

(56) References Cited

U.S. PATENT DOCUMENTS

| | | | | |
|---|---|---|---|---|
| 3,732,463 | A * | 5/1973 | Dale | H02H 3/33 |
| | | | | 361/45 |
| 4,384,243 | A * | 5/1983 | Muskovac | H02J 3/1892 |
| | | | | 318/729 |
| 4,896,089 | A * | 1/1990 | Kliman | H02P 1/163 |
| | | | | 318/400.21 |
| 2005/0083617 | A1* | 4/2005 | Blumenauer | H02H 1/0038 |
| | | | | 361/42 |
| 2006/0158799 | A1* | 7/2006 | Chan | H02H 3/347 |
| | | | | 361/42 |
| 2008/0012670 | A1* | 1/2008 | Davison | H01H 71/74 |
| | | | | 335/172 |
| 2009/0296289 | A1* | 12/2009 | Valdez | H02H 3/17 |
| | | | | 361/47 |
| 2014/0132199 | A1* | 5/2014 | Zanelato | H02P 1/42 |
| | | | | 318/785 |
| 2014/0153144 | A1* | 6/2014 | Lacey | H02H 3/33 |
| | | | | 361/45 |
| 2015/0136751 | A1* | 5/2015 | Hanschke | H05B 1/0275 |
| | | | | 219/202 |

* cited by examiner

*Primary Examiner* — Jorge L Carrasquillo
(74) *Attorney, Agent, or Firm* — Indiano & McConnell LLC

(57) ABSTRACT

A method is disclosed providing ground fault circuit interruption protection for a pump motor which includes determining a current difference between at least two leads located on a load side of an electromechanical device, wherein the electromechanical device is configured to mechanically drive a road, and wherein the method further comprises interrupting a flow of current in response to the current difference exceeding a threshold current difference.

18 Claims, 4 Drawing Sheets

LOAD SIDE GROUND FAULT CIRCUIT INTERRUPTION PROTECTION FOR FLUID PUMP MOTOR

CROSS REFERENCE TO RELATED APPLICATIONS

The present application claims the benefit of U.S. Provisional Patent Application No. 62/353,661, filed Jun. 23, 2016, the entirety of which is incorporated by reference herein.

BACKGROUND

The technical field generally relates to circuits including ground fault circuit interrupters (GFCIs). Various applications, such as submersible well pumps and the like, require that a motor be operated in or near water. However, the use of art electric device in or near water, or any other conductive fluid, can create a shock hazard. Typical circuit breakers do not provide adequate protection from shock hazards.

GFCI circuit breakers provide adequate protection from shock hazards but have many drawbacks. A GFCI detects a difference in current, typically at an outlet or other line in, and interrupts the circuit if a variation between conductors of approximately 5 milliamps is detected. The current difference which will trigger a GFCI fault can be very small relative to a current difference which will trip a circuit breaker. Furthermore, a GFCI can often interrupt the circuit in less than one fortieth of a second. However, GFCIs are not suitable for many applications. Induction motors, for example, can cause nuisance tripping due to current leakage during motor startup. This nuisance tripping is especially prevalent with three phase motors. Once a GFCI is tripped, motor operation is prevented until the GFCI is reset. In the case of a well pump this nuisance tripping can cause great inconvenience; however, in the case of a sump pump this can cause catastrophic results such as flooding. Many applications involving induction motors presently do not require the use of a GFCI. However, in these applications there is still a risk of shock hazard. Therefore, further technological developments are desirable in this area.

SUMMARY

One embodiment of the present application includes a method for detecting a ground fault on the load side of a motor. Other embodiments include unique motor load side ground fault protection apparatuses, systems, and methods. Further embodiments, inventions, forms, objects, features, advantages, aspects, and benefits of the present application are otherwise set forth or become apparent from the description and drawings included herein.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
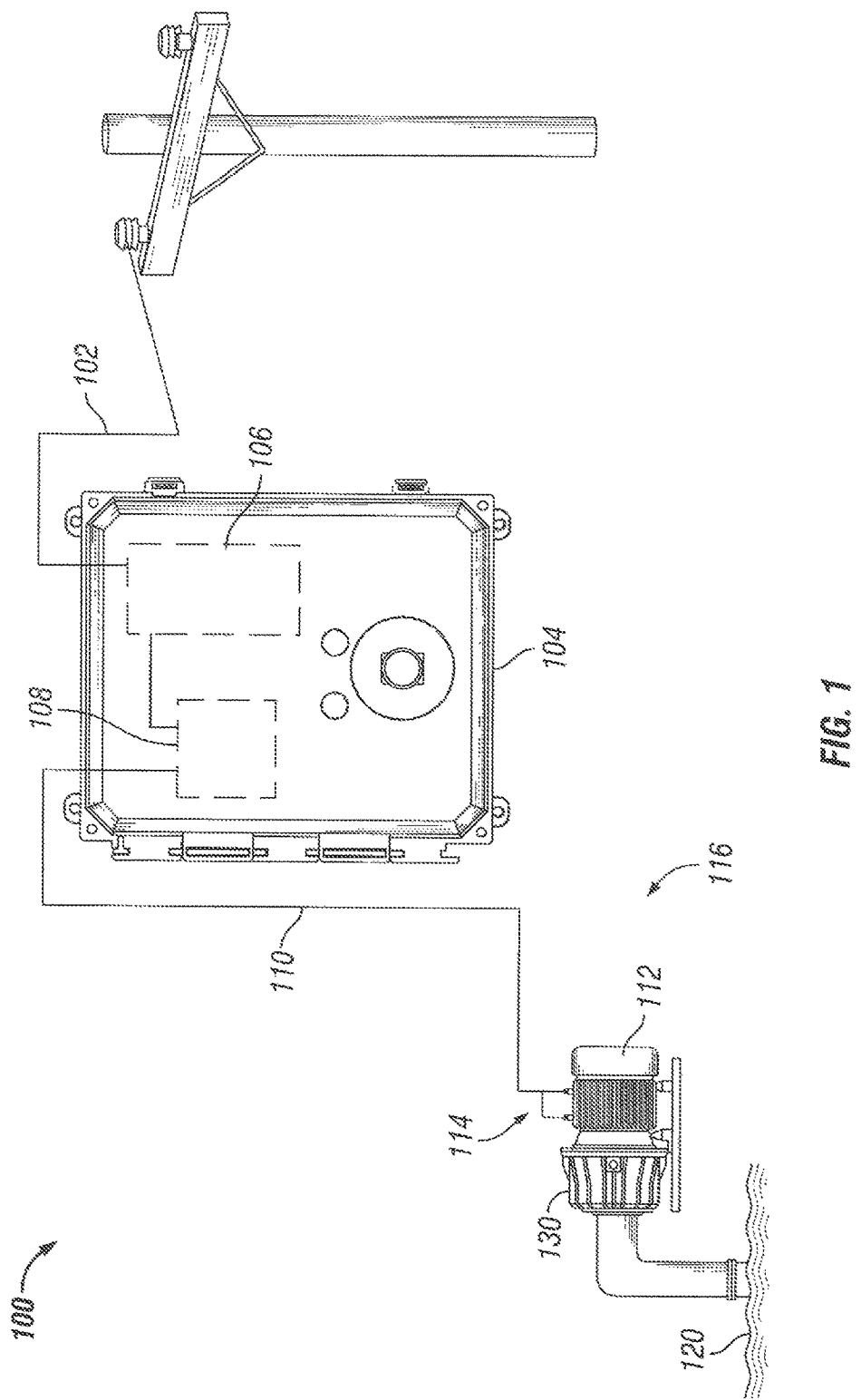
FIG. 1 is a schematic diagram of one embodiment of a GFCI system of the present application.

For purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated device, and any further applications of the principles of the invention as illustrated therein being contemplated as would normally occur to one skilled in the art to which the invention relates.

FIG. 1 illustrates one embodiment of a system 100 protected by ground fault circuit interruption (GFCI). System 100 illustrates an electric line in 102, a control panel 104, and a load line out 110. The electric line in 102 provides electricity from a power source such as a power grid, generator, or the like. The load line 110 is in electrical communication with an electric motor 112 via motor leads 114. The electric motor 112 mechanically powers a load 130. The control panel 104 includes a GFCI 108 and can include a motor controller 106.

The electric motor 112 can be any electromechanical device capable of converting electrical energy from the load line 110 into mechanical energy to power the load 130. The electric motor 112 receives electrical energy through one or more motor leads 114. In one form the electric motor 112 is a three-phase alternating current asynchronous permanent magnet motor. However, other electric motors are contemplated including, but not limited to direct current motors, single or two-phase alternating current motors, alternating current synchronous motors, or the like.

The load 130 is mechanically powered by the electric motor 112. In one form, the load 130 is a fluid pump. In FIG. 1, the load 130 is illustrated as a jet pump such as can be utilized to pump water 120 from a well. The fluid pump 130 can be a centrifugal pump, axial pump, piston pump, or the like. In various forms, the electric motor 112 and load 130 can be in a sealed housing such as for underwater applications, such as for submersible pumps. In other forms, it is contemplated that the load 130 is a hydraulic pump, a sewage pump, or any other fluid type pump. However, it is contemplated that the load 130 can take any form which can be mechanically driven by the electric motor 112.

The electric motor 112 and pump 130 are illustrated as being in a fluid 120. The fluid 120 can be a body of water such as a well, pond, lake, river or the like. Alternately, the fluid 120 can be hydraulic fluid and/or any other fluid 120. In some forms, a portion of the system 100, on or near the electric motor 112, is subject to wet or damp conditions. Wet or damp conditions frequently occur in factories, in which the present GFCI scheme can be desirable. Although specific examples have been described hereto, it should be appreciated that any system 100 in which GFCI protection is desired is contemplated herein.

The GFCI 108 prevents the flow of electricity through a portion of the system 100 in response to a fault condition. As is illustrated, the GFCI 108 is located such that it detects the current passing through the load side 116 of the electric motor 112. In one form, the GFCI 108 senses the current difference between the motor leads 114. These motor leads 114 can include one or more hot wires and/or a neutral wire (in the situation of a single phase motor), whereby the GFCI 108 detects the current difference therebetween. For example, in a three phase motor, the GFCI 108 can detect the current between the three motor leads. In a two phase motor, the GFCI 108 can detect the current between the two motor leads. In an x phase motor, the GFCI 108 can detect the current between two through x motor leads 114. In response to the current difference exceeding a threshold difference, the GFCI 108 will cause the circuit to be interrupted such that electricity cannot flow to the motor 112. As will be understood by one of ordinary skill in the art, the threshold difference can vary depending upon the specific application and desired parameters of the GFCI 108.

Detecting the current difference on the load side 116 of the electric motor 112 significantly reduces the instances of nuisance tripping, in that a lesser amount of current leakage will be detected at the load side 116 of the electric motor 112 relative prior art GFCI connections. This reduction of nuisance tripping can allow the GFCI 108 to be utilized in numerous applications in which it would not have been practical and/or desirable to utilize a GFCI 108 system of the prior art.

The GFCI 108 can interrupt the circuit in various ways. For example, should a controller 106, such as a digital motor controller 106 be present in the system, the GFCI 108 can signal the digital controller 106 to cut power to the electric motor 112. Alternately, the GFCI 108 may signal a simple relay (not illustrated) or other switch to cut power to the electric motor 112. Although the controller 106 and relay (not illustrated) have been described as being distinct from the GFCI 108, it is contemplated that the relay can be incorporated into the GFCI 108 or that the GFCI 108 can be incorporated into the controller 106. As can be appreciated by one of ordinary skill in the art, any method may be utilized to cut power to the motor 112, or other portion of the system 100, in response to the GFCI 108 detecting a fault condition.

As is illustrated in FIG. 1, a motor controller 106 and GFCI 108 are illustrated in a control panel 104. In one form, the control panel 104 can filter current spikes or the like from the line in 102 relative the load line 110. As will be discussed with regard to FIGS. 2-4, the control panel 104 can contain various controllers, breakers, relays, and the like. The control panel 104 can include one or more computing devices having memory, processing, and communication hardware. The controller 106 may be a single device or a distributed device, and the functions of the controller 106 may be performed by hardware or software. However, the GFCI 108 can be disposed in the system 100 in any manner, internal or external to the control panel 104, such that the GFCI 108 can detect the current from the load side 116 of the electric motor 112 and can cause power to be cut to at least a portion of the system 100 in response to the GFCI 108 detecting a fault condition.

Figure 2:
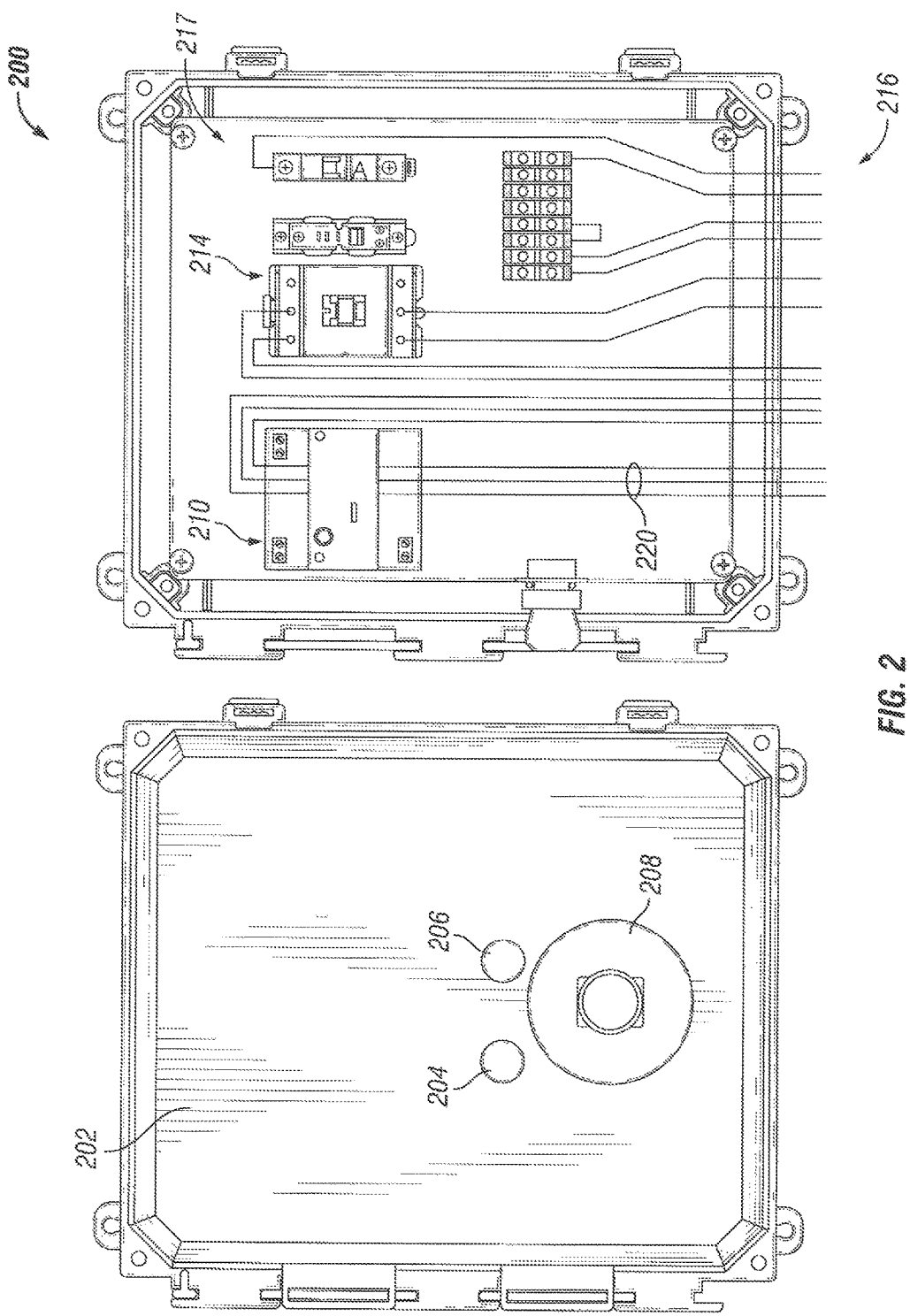
FIG. 2 is a schematic illustration of one embodiment of a control panel including a GFCI protection scheme.

FIG. 2 illustrates one embodiment of a control panel 200 of the present application including an outer cover 202 and an interior portion 217. The outer cover 202 can have various controls, including an emergency stop 208, a GFCI test 204, and a GFCI reset 206. The interior 217 can include a relay 214 and a plurality of wires 216 including, but not limited to L1 leading to a pump control box (not shown), L2 leading to the pump control box (not shown), and a 240V from the breaker. Wiring 216 can further include an incoming 120V hot, an incoming neutral, a pressure switch input, and a pressure switch output. Pump leads from the pump control box (not shown) are directed into a GFCI sensor 210 which detects the current across the pump leads 220 to the pump motor. As was aforementioned, should the GFCI sensor 210 determine a fault condition based on the current across the pump leads 220, the GFCI 210 can interrupt the current to the pump motor. In this embodiment, the GFCI sensor 210 can interrupt the current to the pump motor via a relay internal to the GFCI sensor 210 or via signaling the pump control box (not shown) to cut power to the pump motor.

Figure 3:
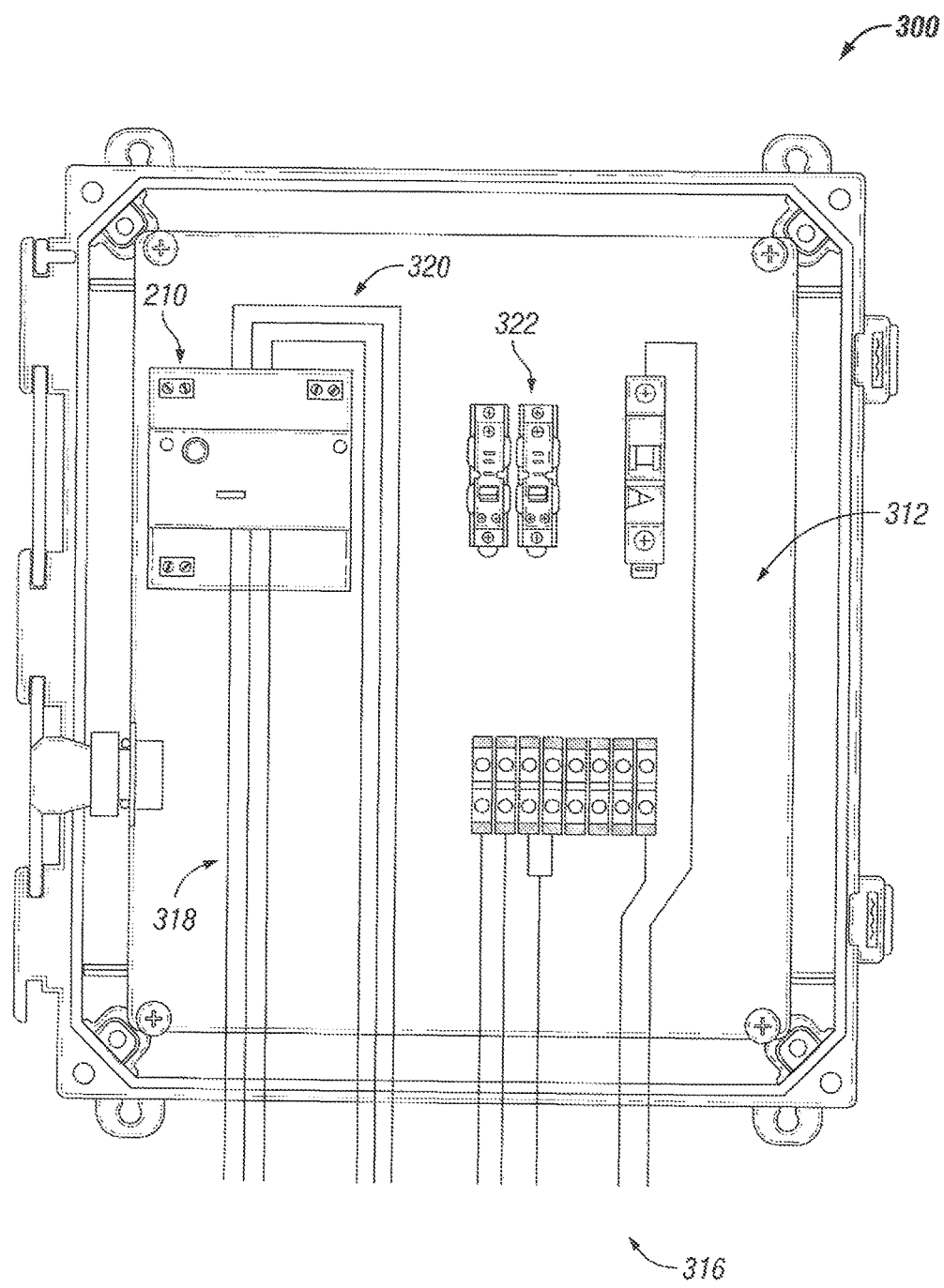
FIG. 3 is a schematic illustration of an alternate embodiment of a control panel including a GFCI protection scheme.

FIG. 3 illustrates another control panel 300. The inner portion 312 of the control panel includes a plurality of wires 316 including an incoming 120V hot, an incoming neutral, a plurality of variable frequency drive (VFD) run jumpers, and a relay 322. Leads 320 from the variable frequency drive are routed to the GFCI sensor 210. The GFCI sensor 210 detects the current across the pump leads to the pump motor 318. Should the GFCI sensor 210 detect a fault, the GFCI 210 can interrupt the current to the pump motor via an internal relay (not shown).

Figure 4:
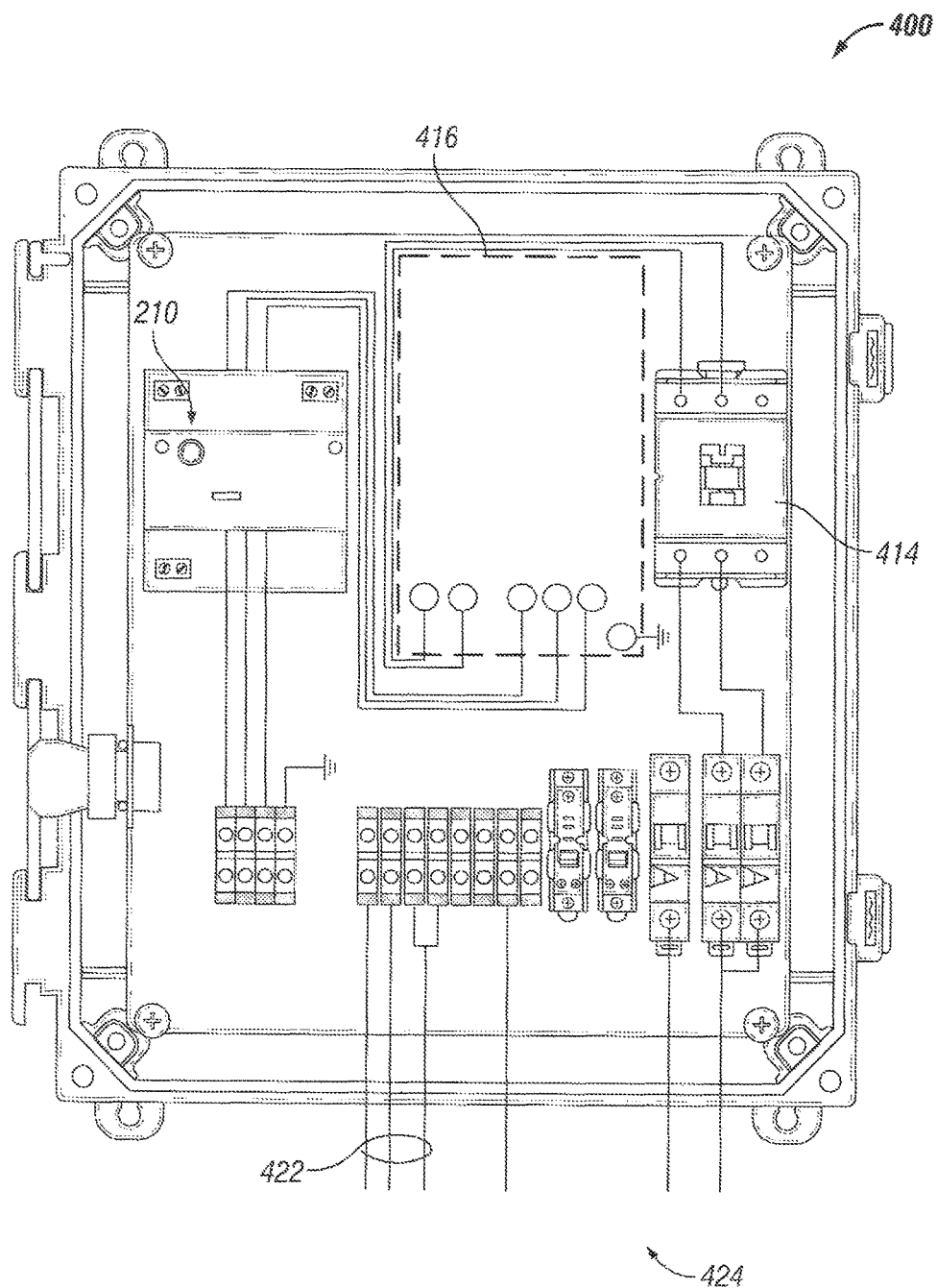
FIG. 4 is a schematic illustration of a further embodiment of a control panel including a GFCI protection scheme.

FIG. 4 illustrates another form of a control panel 400. The inner portion of the control panel includes an incoming 120V hot, an incoming 230V hot, and an incoming neutral, wherein the incoming 120V hot, the incoming 230V hot, and the incoming neutral are depicted at 424. Control run jumpers 422 are provided as well as a relay 414. A motor control box is illustrated at 416. In this form, the control box 416 can detect the current difference between the phases of the motor. Should the current difference between two or more of the phases exceed a predetermined threshold (e.g. 5 milliamps), the control box 416 can interrupt power to the motor. Additionally and/or alternately, GFCI 210 can detect the current difference between the phases of the motor and can signal the control box 416 to interrupt power to the motor in response to a fault condition.

As can be appreciated by one of ordinary skill in the art, although FIGS. 2-4 depict specific wiring schemes, relays and voltages, it is contemplated that various voltages, controllers, relays, and wiring schemes (such as those including multiple motor controls inside one or more enclosures) can be utilized depending upon the specific application and design parameters. Furthermore, it is contemplated that the present application can be applied to any motor in which GFCI protection is desired, including but not limited to, factories, naval applications, and/or pumps.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A method for providing ground fault circuit interruption protection for a pump motor, comprising:

providing an electric motor configured to mechanically drive a load, a motor controller in electronic communication with the motor, and a control panel housing the motor controller, wherein the control panel includes an emergency stop located on an outer cover of the control panel such that the emergency stop can be activated with the outer cover closed on the panel;

providing a ground fault circuit interrupter device configured to determine a current difference between at least two motor leads located between the motor controller and the electric motor, on a load side of the electric motor downstream of the motor controller and upstream of the motor; and interrupting a flow of current to the electric motor in response to the current difference exceeding a threshold current difference, and wherein the outer cover further includes a ground fault circuit interrupter device reset.

2. The method for providing ground fault circuit interruption protection for a pump motor of claim 1, wherein the electric motor comprises a multi-phase motor, and wherein determining the current difference further comprises determining the current difference between at least two phases of the multi-phase motor.

3. The method for providing ground fault circuit interruption protection for a pump motor of claim 2, wherein determining the current difference further comprises detecting a current for each phase of the multi-phase motor and determining the current difference between each of the at least two phases of the multi-phase motor.

4. The method for providing ground fault circuit interruption protection for a pump motor of claim 2, wherein the motor controller comprises a digital motor controller, and wherein the digital motor controller is operable to interrupt the flow of current to the multi-phase motor in response to the current difference exceeding the threshold current difference.

5. The method for providing ground fault circuit interruption protection for a pump motor of claim 1, wherein the threshold current difference is between three and seven milliamps.

6. The method for providing ground fault circuit interruption protection for a pump motor of claim 5, further comprising providing a water pump, wherein the electric motor is structured to provide mechanical power to drive the water pump.

7. The method for providing ground fault circuit interruption protection for a pump motor of claim 1, wherein interrupting the flow of current further comprises tripping a relay.

8. A method, comprising:
placing an electric motor in electric communication with a power source;
providing a motor controller in electric communication with the electric motor;
connecting at least one disconnect in electric communication between the electric motor and the power source, wherein the at least one disconnect is structured to selectively interrupt a flow of current from the power source to the electric motor;
connecting a ground fault circuit interrupter device in electric communication with a load side of the electric motor, downstream of the motor controller and upstream of the motor, wherein the ground fault circuit interrupter device is operable to determine a current difference between at least two wires located on a load side of the electric motor, at a location between the motor controller and the electric motor, and wherein the disconnect is structured to interrupt the flow of current to the electric motor in response to the current difference exceeding a threshold difference; and
providing a control panel configured to house the ground fault circuit interrupter device, and wherein an outer cover of the control panel further includes an emergency stop and a ground fault circuit interrupter device reset located on an outer portion of the outer cover such that the emergency stop and the ground fault circuit interrupter device can be activated with the outer cover closed on the panel.

9. The method of claim 8, wherein the electric motor comprises a multi-phase motor, and wherein the ground fault circuit interrupter device is structured to determine the current difference between at least two phases of the multi-phase motor.

10. The method of claim 8, further comprising providing a water pump operably coupled to the electric motor, wherein the electric motor is configured to mechanically drive the water pump.

11. The method of claim 8, wherein the disconnect is integral to the ground fault circuit interrupter device.

12. The method of claim 8, wherein the motor controller further comprises a digital motor controller structured to control the electric motor, wherein at least one of the disconnect and the ground fault circuit interrupter device are integral to the digital motor controller.

13. A system, comprising:
an electric motor in electric communication with a power source;
a motor controller in electrical communication with the electric motor;
a disconnect in electric communication with the electric motor, wherein the disconnect is operable to selectively interrupt a flow of current to the electric motor;
a plurality of leads connected between the motor controller and the electric motor, at a load side of the electric motor;
a ground fault circuit interrupter device connected with at least two of the plurality of leads, downstream of the controller and upstream of the motor, wherein the ground fault circuit interrupter is operable to determine a current difference between the at least two leads, wherein the ground fault interrupter device is configured to determine a fault condition in response to the current difference, wherein the ground fault interrupter device is further operable to signal the disconnect to interrupt the flow of current to the electric motor in response to the fault condition, and wherein the ground fault interrupter device is free from direct communication with a line side; and
a control panel configured to house the motor controller, wherein the control panel further includes an emergency stop and a ground fault interrupter device reset accessible when the control panel is in a closed position.

14. The system of claim 13, wherein the fault condition further comprises the current difference exceeding a threshold current difference between three and seven milliamps.

15. The system of claim 13, wherein the electric motor is a multi-phase motor, and wherein the current difference is determined across two or more phases of the multi-phase motor.

16. The system of claim 13, further comprising a fluid pump operably coupled to the electric motor, wherein the electric motor is structured to mechanically drive the fluid pump.

17. The system of claim 16, wherein the fluid pump is at least one of a jet pump, a sewage pump, a submersible pump, and a sump pump.

18. The system of claim 13, wherein the disconnect is integrated into the ground fault circuit interrupter device.

* * * * *